(12) United States Patent
McCarthy et al.

(10) Patent No.: US 12,505,209 B2
(45) Date of Patent: Dec. 23, 2025

(54) CYBERSECURITY WORKFLOW MANAGEMENT USING AUTODETECTION

(71) Applicant: Artic Wolf Networks, Inc., Eden Prairie, MN (US)

(72) Inventors: Joshua McCarthy, Morgan Hill, CA (US); David B McKinley, Dartmouth, MA (US); Lance Rund, San Jose, CA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 339 days.

(21) Appl. No.: 18/130,934

(22) Filed: Apr. 5, 2023

(65) Prior Publication Data

US 2023/0252138 A1 Aug. 10, 2023

Related U.S. Application Data

(63) Continuation-in-part of application No. 17/825,024, filed on May 26, 2022.
(Continued)

(51) Int. Cl.
*G06F 21/55* (2013.01)
*G06F 21/56* (2013.01)
*G06F 21/57* (2013.01)

(52) U.S. Cl.
CPC .......... *G06F 21/554* (2013.01); *G06F 21/566* (2013.01); *G06F 21/577* (2013.01)

(58) Field of Classification Search
CPC ..... G06F 21/554; G06F 21/566; G06F 21/577
See application file for complete search history.

(56) References Cited

U.S. PATENT DOCUMENTS 8,392,218 B2 3/2013 Becker et al.
10,534,971 B2 1/2020 Huber, Jr. et al.
(Continued)

FOREIGN PATENT DOCUMENTS

KR 10-2020-0083874 A 7/2020
WO WO-2021028060 A1 * 2/2021 ........... G06F 21/554

OTHER PUBLICATIONS

Sangani, Nilaykumar Kiran, and Haroot Zarger. "Machine learning in application security." Advances in Security in Computing and Communications. IntechOpen, 2017.
(Continued)

*Primary Examiner* — Thomas A Gyorfi
(74) *Attorney, Agent, or Firm* — Barnes & Thornburg LLP

(57) ABSTRACT

Disclosed techniques include cybersecurity workflow management using autodetection. A cybersecurity threat protection workflow is accessed. At least one cybersecurity threat protection application notification is received. The cybersecurity threat protection application notification causes an irreversible action to be scheduled by the workflow. The irreversible action comprises a destructive response. The destructive response includes killing a process, deleting an account, shutting down a computer, wiping a computer, or shutting down a router. The irreversible action is detected before it is implemented by the workflow. The irreversible action in the workflow is mitigated using a supervisory workflow element. The mitigating the irreversible action comprises initiating a machine learning algorithm. The machine learning algorithm enables a near real-time response. The machine learning algorithm self-triggers the actionable response. An actionable response is triggered based on an analysis of the irreversible action. The action-
(Continued)

able response comprises notifying a cybersecurity professional. The notification includes a recommendation.

24 Claims, 7 Drawing Sheets

Related U.S. Application Data

(60) Provisional application No. 63/451,249, filed on Mar. 10, 2023, provisional application No. 63/404,983, filed on Sep. 9, 2022, provisional application No. 63/350,891, filed on Jun. 10, 2022, provisional application No. 63/327,853, filed on Apr. 6, 2022, provisional application No. 63/297,273, filed on Jan. 7, 2022, provisional application No. 63/274,302, filed on Nov. 1, 2021, provisional application No. 63/234,729, filed on Aug. 19, 2021, provisional application No. 63/193,615, filed on May 27, 2021.

(56) References Cited

U.S. PATENT DOCUMENTS

| | | | |
|---|---|---|---|
| 10,621,172 B2 | 4/2020 | Azaria et al. | |
| 10,776,316 B2 | 9/2020 | Baggeroer et al. | |
| 10,838,709 B2 | 11/2020 | Eapen et al. | |
| 10,901,863 B2 | 1/2021 | Lukkoor et al. | |
| 10,922,452 B2 | 2/2021 | Liu et al. | |
| 10,924,527 B2 | 2/2021 | Miller | |
| 10,936,234 B2 | 3/2021 | Su | |
| 10,938,706 B1 | 3/2021 | Zacks et al. | |
| 10,938,951 B2 | 3/2021 | White et al. | |
| 10,956,880 B2 | 3/2021 | Towle | |
| 11,463,463 B1* | 10/2022 | Phung | H04L 63/1425 |
| 2013/0318542 A1 | 11/2013 | Zamora | |
| 2015/0026810 A1 | 1/2015 | Friedrichs et al. | |
| 2018/0121316 A1 | 5/2018 | Ismael et al. | |
| 2019/0098025 A1* | 3/2019 | Lim | G06N 20/00 |
| 2020/0143060 A1* | 5/2020 | Tineo | G06F 21/577 |
| 2020/0244412 A1 | 7/2020 | Kalhan | |
| 2020/0280443 A1 | 9/2020 | Simons | |
| 2020/0305011 A1 | 9/2020 | Yaniv et al. | |
| 2020/0342552 A1 | 10/2020 | Sulit et al. | |
| 2020/0363781 A1 | 11/2020 | Mangels et al. | |
| 2020/0380006 A1 | 12/2020 | Rockwell et al. | |
| 2021/0014153 A1 | 1/2021 | Amend et al. | |
| 2021/0042589 A1 | 2/2021 | Tokarev Sela et al. | |
| 2021/0070333 A1 | 3/2021 | Chen | |
| 2021/0099420 A1 | 4/2021 | Zhang | |
| 2021/0312058 A1* | 10/2021 | Chiarelli | G06Q 10/067 |
| 2022/0309166 A1* | 9/2022 | Shenoy | G06F 21/577 |

OTHER PUBLICATIONS

Boutaba, Raouf, et al. "A comprehensive survey on maching learning for networking: evolution, applications and research opportunities." Journal of Internet Services and Applications 9.1 (2018): 1-99.

International Search Report dated Aug. 31, 2022 for PCT 2022/031003.

* cited by examiner

CYBERSECURITY WORKFLOW MANAGEMENT USING AUTODETECTION

RELATED APPLICATIONS

This application claims the benefit of U.S. provisional patent applications "Cybersecurity Workflow Management Using Autodetection" Ser. No. 63/327,853, filed Apr. 6, 2022, "Cybersecurity Operations Center Load Balancing" Ser. No. 63/350,891, filed Jun. 10, 2022, "Cybersecurity Operations Case Triage Groupings" Ser. No. 63/404,983, filed Sep. 9, 2022, and "Cybersecurity Operations Mitigation Management" Ser. No. 63/451,249, filed Mar. 10, 2023.

This application is also a continuation-in-part of U.S. patent application "Cybersecurity Threat Management Using Element Mapping" Ser. No. 17/825,024, filed May 26, 2022, which claims the benefit of U.S. provisional patent applications "Cybersecurity Threat Management Using Element Mapping" Ser. No. 63/193,615, filed May 27, 2021, "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, and "Cybersecurity Workflow Management Using Autodetection" Ser. No. 63/327,853, filed Apr. 6, 2022.

Each of the foregoing applications is hereby incorporated by reference in its entirety.

FIELD OF ART

This application relates generally to cybersecurity management and more particularly to cybersecurity workflow management using autodetection.

BACKGROUND

Author Vince Flynn once said, "A good football team plays offense and defense. You have to be aggressive and disrupt." The same can be said about cybersecurity in the modern era. A good cybersecurity strategy plays both offense and defense. The IT security team must be aggressive and disruptive against the cyberattacks of bad actors of all sorts, from outside of the organization or within, whether the threat is intentional, blithely ignorant, or merely indifferent. Cybersecurity is the practice of protecting critical computer systems and sensitive data from digital and physical attacks. IT security measures are designed to combat threats against networked systems and applications, whether the threats originate from outside or inside the organization. As the complexity of IT computer networks grows, both in terms of connectivity and system computing capabilities, the vulnerability of the IT networks increases as well. The sheer number of endpoints, network infrastructure components, databases, applications, and users all contribute to a rapidly expanding need for efficient and effective IT security services that protect users, data, applications, and business viability without sacrificing system functionality or acceptable response times. Cybersecurity encompasses every level of IT technology—physical infrastructure, network communications, data transformation, data storage, applications, interactions between applications, end-point hardware, operating systems, and users themselves. Cyberattacks can occur at any point in an IT environment, from malicious, intentional damage to computer components to improperly coded updates to an application; from communication disruptions caused by weather to ransomware attacks on critical databases.

Cybersecurity defense strategies include security awareness programs for users. Users must be trained and routinely reminded to protect data on their computers and their desktops; avoid pop-ups, unknown emails and hyperlinks; use strong passwords that are changed on a routine basis; enable firewall protection both at work and at home; connect to secure Wi-Fi networks; keep browsers, applications, and operating systems updated; and so on. A strong backup program is also necessary to make certain that important work is preserved if a computer system goes down, whether downtime is caused by intentional disruptions or by natural disasters. Endpoint security includes encryption and access control techniques such as strong passwords, multifactor authentication, and anti-virus and malware applications. Applications, network components, workstations, and peripheral devices must be installed by authorized IT staff, regardless of the hardware level, including servers, personal computers, and mobile devices. The Zero Trust security model put forth by the White House in May 2021 and being implemented by many U.S. companies calls for eliminating "implicit trust in any one element, node, or service and instead requires continuous verification of the operational picture via real-time information from multiple sources to determine access and other system responses. In essence, a Zero Trust architecture allows users full access but only to the bare minimum they need to perform their jobs."

SUMMARY

Organizations of all sizes seek continuous and reliable computing operations since the organizations are directly and critically dependent on those operations. The continuous computing operations are enabled by effective and thorough management of cybersecurity threats. The organizations include businesses, financial institutions, hospitals, government agencies, retailers, universities, schools, and so on. All organizations are acutely aware of myriad cybersecurity threats. They actively configure, implement, and deploy state-of-the art cybersecurity hardware and software to secure their information technology (IT) infrastructure against the threats. While preventive measures such as installing application and operating system updates, former user deactivation, security checkups, and other housekeeping activities are critical to successful IT operations, these measures alone are insufficient for providing comprehensive IT infrastructure protection. The cybersecurity threats are rapidly evolving and are becoming significantly more sophisticated. Thus, constant system-wide vigilance and anticipatory action are required. Nearly as soon as a cybersecurity solution is found that identifies, responds to, and eradicates a threat such as a virus; thwarts a Trojan horse program; or detects and deletes a phishing attack; the malefactors behind the cybersecurity attacks adapt their techniques by using new attack vectors; advanced social engineering ploys; hacking; data theft; and many other deceptive, malicious, and illegal techniques.

Disclosed techniques enable cybersecurity management based on a cybersecurity workflow management using autodetection. A cybersecurity threat protection workflow is accessed. The threat protection workflow can include steps, techniques, procedures, codes, applications, and so on for detecting cybersecurity threats and for mitigating those detected threats. The workflow contains scheduled actions, where some of the actions can be irreversible. At least one cybersecurity threat protection application notification is received. The cybersecurity threat protection application notification can cause an irreversible action to be scheduled by the workflow. The irreversible action can include a destructive response where the destructive response can include killing a process, deleting an account, shutting down a computer, wiping a computer, shutting down a router, and so on. Irreversible actions can include deleting files, reconfiguring a network, and the like. The cybersecurity threat protection applications from which the notification can be received can include one or more data management schemas. The plurality of threat protection applications can include cybersecurity threat protection application capabilities. The cybersecurity threat protection application capabilities can include endpoint protection, anti-phishing protection, antivirus protection, firewall protection, man-in-the-middle protection, denial of service protection, distributed denial of service protection, and ransomware protection.

The irreversible action is detected before it is implemented by the workflow. The detecting the irreversible action can include analysis of the actions included in the workflow. The detecting the irreversible action can include parsing verbs in the cybersecurity threat protection application notification. The detecting the irreversible action can be based on metadata from the cybersecurity threat protection application. The metadata can include network metadata. The irreversible action is mitigated in the workflow, using a supervisory workflow element. The mitigating the irreversible action can include initiating a machine learning algorithm, where the machine learning algorithm can enable near real-time response. The machine learning algorithm can self-trigger the actionable response. An actionable response is triggered based on an analysis of the irreversible action. The actionable response can include notifying a cybersecurity professional. The notification for the cybersecurity professional can include a recommendation.

A computer-implemented method for cybersecurity management is disclosed comprising: accessing a cybersecurity threat protection workflow; receiving at least one cybersecurity threat protection application notification, wherein the cybersecurity threat protection application notification causes an irreversible action to be scheduled by the workflow; detecting the irreversible action before it is implemented by the workflow; and mitigating the irreversible action in the workflow, using a supervisory workflow element. In embodiments, the detecting is based on analysis of at least one additional cybersecurity threat protection application notification. In embodiments, the irreversible action comprises a destructive response. In embodiments, the destructive response includes killing a process, deleting an account, shutting down a computer, wiping a computer, or shutting down a router. And in embodiments, the mitigating includes pausing the irreversible action until a subsequent cybersecurity threat protection application notification is received.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
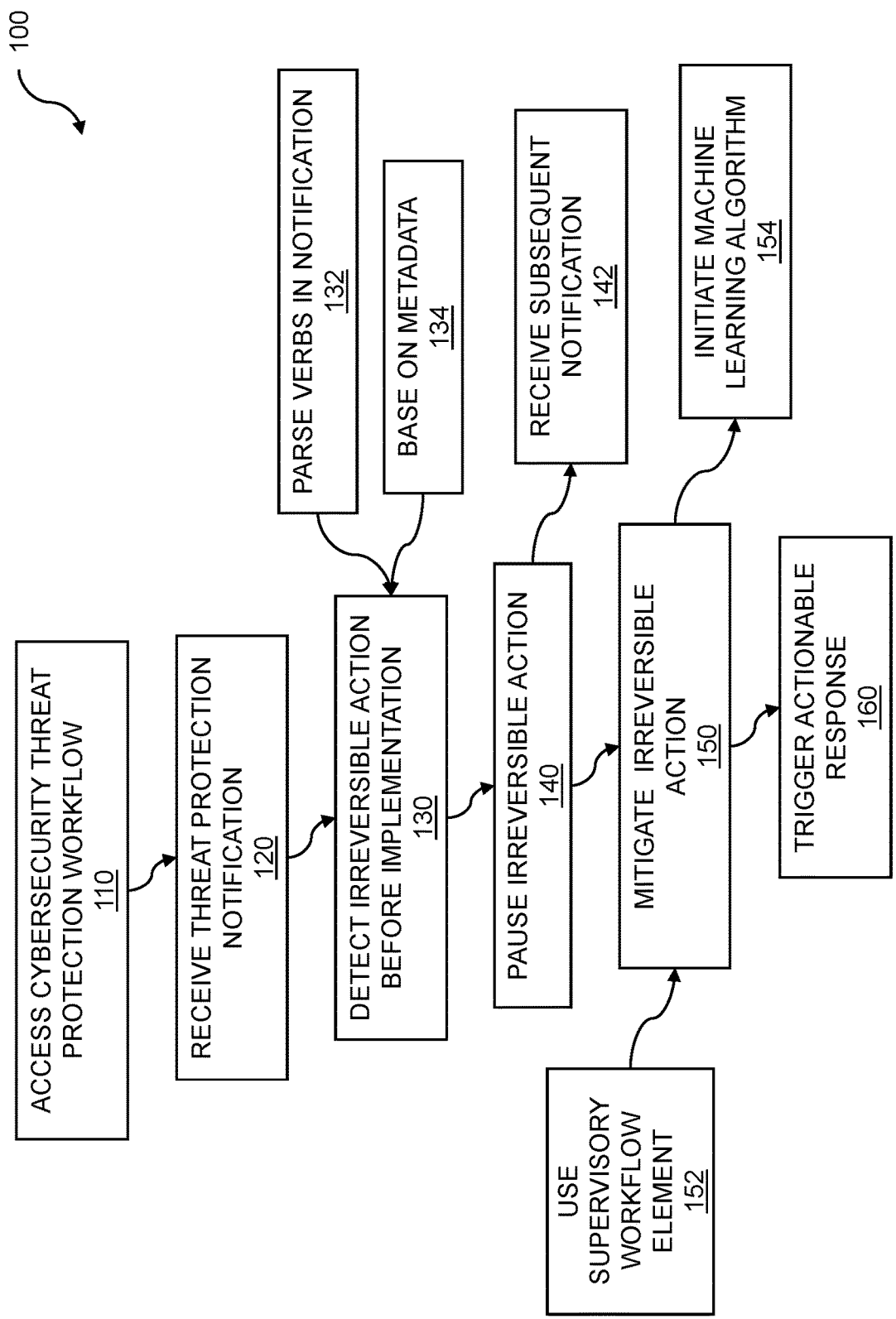
FIG. 1 is a flow diagram for cybersecurity workflow management using autodetection.

Bad actors and villains, whether foreign or domestic, mount sophisticated, near-constant attacks on the information technology infrastructures of enterprises of all types and sizes. These malefactors include criminals and organized crime; government sponsored, endorsed, and protected actors; plus, terrorists and extortionists; among many others with malicious intent. Businesses, retailers, universities, government agencies, hospitals, research laboratories, and other enterprises and organizations are under near-constant attack. Cybersecurity threats such as cyberattacks have been detected to occur as often as every few seconds. Enterprises from sectors such as high technology and retail, and government agencies including defense and air traffic control, are by far the most frequently targeted. These "big three" sectors are attacked because of the value of their data and their capabilities to execute large financial payouts. Other targets of high value include media companies who are claimed by cyber-attackers to have insulted or humiliated national leaders, and national infrastructures such as fuel pipelines and energy grids. Even small businesses and individuals are not immune from cybercriminal attacks and are further targeted. The smaller enterprises and the individuals are targets for quick payouts, even if relatively small, and for identity theft. Fuel and energy infrastructures are attacked because of the potential to cause both huge energy delivery disruptions and financial market chaos. Small enterprises have been willing to pay any amount they can to recover their business data from cybercriminals who have maliciously encrypted the enterprises' data. An individual may freely and unwittingly provide usernames and passwords associated with bank or brokerage accounts; personal information such as telephone numbers, email addresses, physical addresses, age, gender, birthdate, national identification number, and so on to the cybercriminals without realizing they are doing so. Illegally obtained personal information has been used to open bank accounts, obtain credit cards or loans, and perform other actions which can ruin the individual's financial wellbeing, credit score, and more. The individual may also drain their personal savings or run up substantial personal debt to transfer funds to what turns out to be an offshore financial institution, thinking they are aiding a friend or loved one in distress.

Enterprises of all sizes expend significant financial and human resources on cybersecurity activities. The cybersecurity activities, which include cybersecurity threat management, are designed to protect computing systems, data, and other critical information technology (IT) infrastructure by detecting and countering cybersecurity threats. Each of the cybersecurity activities plays a central role in securing IT infrastructure, and ensuring safe and reliable computing operations of the enterprises. Further, critical threat protections that are specific to the particular enterprise or the type of enterprise can be configured and deployed. These latter threat protections can include advanced techniques such as biometric verification, two-factor authentication, coded challenges and responses, encrypted or secured communications channels such as virtual private networks, and so on. The enterprises can include public and private organizations that can be large, medium, and small in terms of numbers of employees, annual sales, numbers of locations, and the like. The enterprises can include businesses, hospitals, government agencies, research facilities, universities, among many others. The enterprises are acutely aware that cybersecurity best practices are not merely desirable but moreover are essential to the continued operation of, and likely the survival of, the enterprises.

Cybersecurity, when executed correctly, not only integrates highly complex suites of tools and activities, but is also extremely expensive. Further, the tasks associated with cybersecurity are ever changing ones. The cybersecurity measures taken by the enterprises today can detect and prevent known or recently discovered attack techniques, but the techniques used by cybercriminals are constantly evolving, specifically to thwart or circumvent the cybersecurity measures. Nearly as soon as a detection tool is developed for identifying, reacting to, and eradicating a cybersecurity threat such as a virus, a Trojan horse program, a phishing ploy, or a denial-of-service attack, the cybercriminals adapt their cyberthreat techniques. This results in an ever-escalating, high stakes cyber-game of cat and mouse. The cyberthreat adaptation includes targeting popular electronic devices, using new attack vectors, fine tuning and improving social engineering stratagems, and employing other intentional deceptions. Purported links to scandalous and compromising photographs of famous people, earnest promises of shared wealth from displaced continental nobility, and desperate pleas for help from purported relatives and friends who are in serious legal or financial trouble while visiting distant locations are specifically designed by their perpetrators to induce a visceral reaction and to motivate their victims to react quickly and unthinkingly. Other ploys include completely copying the landing page of a website with which the victim is familiar. Unless the victim looks at the web address, she or he would be unaware of the deception until their personal information is stolen, or their bank accounts are emptied and the funds are transferred to an offshore bank. Further subterfuges include "man-in-the-middle" attacks, where the communications between an unwitting victim and a legitimate web site are monitored to harvest personal information, usernames and passwords, and other confidential information.

In disclosed techniques, cybersecurity threat management is accomplished based on cybersecurity workflow management using autodetection. A cybersecurity threat protection workflow can be accessed. The threat protection workflow that is accessed can include steps, applications, codes, procedures, heuristics, techniques, and so on for detecting cybersecurity threats and for mitigating those detected threats. The workflow contains scheduled actions, where some of the actions can be irreversible. At least one cybersecurity threat protection application notification is received, wherein the cybersecurity threat protection application notification causes an irreversible action to be scheduled by the workflow. The at least one cybersecurity threat protection applications can be network-connected and can generate data associated with IT infrastructure operation. The IT infrastructure operation can include normal operation, anomalous operation, detected cyberattacks, and so on. The irreversible action is detected before it is implemented by the workflow. The detecting the irreversible action can include parsing verbs in the cybersecurity threat protection application notification. The detecting the irreversible action can further be based on metadata such as network metadata from the cybersecurity threat protection application. The irreversible action in the workflow is mitigated using a supervisory workflow element. The mitigating the irreversible action can include initiating a machine learning algorithm. An actionable response can be triggered based on an analysis of the irreversible action. The actionable response can include notifying a cybersecurity professional.

FIG. 1 is a flow diagram for cybersecurity workflow management using autodetection. Cybersecurity management can be accomplished based on techniques associated with cybersecurity workflow management using autodetection. One or more notifications generated by a variety of cybersecurity threat protection applications can be received using a supervisory workflow element which can monitor and process the notifications. The notifications that are received by the supervisory workflow element can be tracked for cybersecurity threats. The cybersecurity threats can include possible threats, known threats, confirmed threats, etc. The cybersecurity threat can be accompanied by an increase in a number of notifications. The notifications can include or represent an anomalous information technology (IT) infrastructure operation, detected threats and attacks, utilization of discovered vulnerabilities, and so on. Real-time notifications are used to detect an irreversible action before the irreversible action can be implemented by a workflow. Changes in the number of notifications can also be indicative of cybersecurity threats, where the changes can include gradual changes, abrupt changes, discontinuance of notifications, etc.

An actionable response is triggered based on analysis of the irreversible action. The analysis can be used to determine a severity of a threat, an urgency of a threat response, an appropriate response to the threat, etc. The actionable response can be provided to a cybersecurity management system such as a security orchestration, automation, and response (SOAR) system. The actionable response can enable self-healing of a connected security orchestration, automation, and response (SOAR) system. The self-healing of the SOAR system can prevent SOAR downtime. The actionable response can enable scalability of a SOAR system. The scalability of the SOAR can enable scaling of SOAR capabilities to match a given cybersecurity threat load. The actionable response can include notifying a cybersecurity professional. The cybersecurity professional can include an IT staff member, a law enforcement officer, and the like. The notification to the IT professional can include a recommendation such as ignoring the cybersecurity threat protection application notification. The recommendation can include a policy, recommended cybersecurity tools, sources of cybersecurity threat information, etc. The flow 100 shows a computer-implemented method for cybersecurity management.

The flow 100 includes accessing a cybersecurity threat protection workflow 110. A cybersecurity threat protection workflow can include steps, techniques, procedures, codes, applications, algorithms, heuristics, and so on for detecting cybersecurity threats and for mitigating those detected threats. The cybersecurity threat protection workflow can further include a specific sequence for the steps, techniques, procedures, etc. The cybersecurity threat protection workflow can also include one or more irreversible actions (described below).

The flow 100 includes receiving at least one cybersecurity threat protection application notification 120, wherein the cybersecurity threat protection application notification causes an irreversible action to be scheduled by the workflow. The threat protection application can defend computer systems, data systems, data networks, endpoint devices, and so on against various types of malicious cyberattacks. The plurality of cybersecurity threat protection applications can include security information and event management (STEM) applications. More advanced techniques can also be applied. In embodiments, the plurality of cybersecurity threat protection applications can include security orchestration, automation, and response (SOAR) applications (further described below). The malicious cyberattacks can include malware attacks, hacking attacks, distributed denial of service attacks (DDoS), man-in-the-middle attacks, and so on. The applications can include antivirus, anti-phishing, and anti-cryptojacking applications; tools for threat hunting and threat intelligence; identity verification; endpoint protection; forensic investigation; incident management; and so on. The plurality of cybersecurity threat protection applications can include data management schemas. A management schema can be based on a security domain which can contain one or more database objects. Access to the one or more database objects can be controlled by granting access privileges to each user or role, where a role can include a user, a manager, an administrator, and so on.

In embodiments, the irreversible action can include a destructive response. A destructive response can include a response from which one or more elements of an IT infrastructure cannot self-recover or self-correct without repair, replacement, reinstallation, reconfiguration, and the like. In embodiments, the destructive response can include killing a process, deleting an account, shutting down a computer, wiping a computer, or shutting down a router. The process that can be killed can include any networking, security, authentication, or user-initiated process, and so on. The process can be associated an operating system controlling a computer or processor. The account that can be deleted can include a user account, an administrator account, a supervisor account, and so on. In embodiments, the deleting an account can include creating an additional account such as an additional administrator account. The computer that can be shut down can include a general-purpose computer for user tasks, a webserver for providing webpages, a financial applications processor for running payroll or billing, and so on. The computer that can be shut down can include a special-purpose computer such as security server, an authentication server, etc. The wiping the computer can include reformatting storage media, securely reformatting storage media (e.g., multiple data over-writes), scrambling or corrupting data, encrypting data, etc. The shutting down the router can include reconfiguring or disabling the router, forcing a hard shutdown (e.g., powering off), and so on. The shutting down the router can block network access within an enterprise, block access by the enterprise to the Internet, etc.

The flow 100 includes detecting the irreversible action 130 before it is implemented by the workflow. The detecting can be accomplished by analyzing a notification from a cybersecurity threat protection application, comparing notifications from a plurality of threat protection applications, comparing notifications to ones known to contain irreversible actions, and so on. The irreversible action can damage or disable one or more IT infrastructure elements. In the flow 100, the detecting the irreversible action includes parsing verbs 132 in the cybersecurity threat protection application notification. The verbs can be associated with one or more actions such as move, rename, edit, delete, erase, remove, modify, encrypt, and so on. The verbs that are parsed can include commands within the workflow. In embodiments, the verbs can be contained in cybersecurity threat protection application outbound commands. The outbound commands can include commands such as system commands for computers, processors, servers, and so on. The outbound commands can include configuration commands for networking infrastructure such as routers and switches. In the flow 100, the detecting the irreversible action is based on metadata 134 from the cybersecurity threat protection application. The metadata, or "data about the data", can include a number of notifications, the frequency of notifications, changes in notifications, etc. In embodiments, the machine learning algorithm can enable near real-time response. The response can be based on techniques that were successfully applied previously. The response can adapt based on changes, trends, and so on associated with the cybersecurity threats. In embodiments, the machine learning algorithm can self-trigger the actionable response. An actionable response can include halting workflow operation, removing a command from the workflow, substituting commands in the workflow, etc.

The flow 100 includes pausing 140 the irreversible action. The pausing the irreversible action can be associated with a mitigation technique (described below). The pausing can be accomplished by pausing, halting, suspending, etc. the irreversible action. In the flow 100, the pausing can occur until a subsequent cybersecurity threat protection application notification 142 is received. More than one subsequent notification can be received. The one or more subsequent notifications can be received from one or more applications. In embodiments, the subsequent cybersecurity threat protection application notification can be received from a different cybersecurity threat protection application. The notification and the subsequent notification can be analyzed, compared, and so on. The subsequent notification can be used to verify, confirm, or support the first notification. The subsequent notification may conflict with, differ from, or refute the notification. If the notifications are in contradiction to one another, a decision can be made to use one notification while ignoring the other, to seek further subsequent notifications, etc. In other embodiments, the subsequent cybersecurity threat protection application notification can be received from the same cybersecurity threat protection application. The subsequent notification can similarly be used to confirm the notification, to refute the notification, etc. In the latter case of refuting the notification, further subsequent notifications can be sought from the same threat protection application, from one or more additional applications, and so on.

The flow 100 includes mitigating the irreversible action 150 in the workflow. The mitigating the irreversible action can include halting the workflow, suspending the workflow, and so on. The mitigating the irreversible action can include removing the irreversible action from the workflow, substituting a "no operation" (No-Op) action for the irreversible action, replacing the irreversible action with one or more actionable responses, and the like. In the flow 100, the mitigating the irreversible action is accomplished using a supervisory workflow element 152. The supervisory workflow element can include one or more of computers or processors, processor cores within integrated circuits or programmable circuits such as FPGAs or ASICs, and the like. The supervisory workflow element can handle fetching and decoding actions from a workflow, executing actions, etc. The supervisory workflow element can ignore, omit, delete, or otherwise prevent execution of the irreversible action. In embodiments, the workflow and the supervisory workflow element can be managed by a security orchestration, automation, and response (SOAR) system. A SOAR system can provide techniques for threat and vulnerability management, cybersecurity incident response, security operations management, etc. In embodiments, the supervisory workflow element can be structured to perform a test on the cybersecurity threat protection application notification. The test can be used to verify the source of a notification, to determine the validity of a notification, to determine the accuracy of a notification etc. In embodiments, the test can include an if/then analysis, a table lookup analysis, an if/then/else analysis, or a machine learning algorithm-based analysis.

In the flow 100, the mitigating the irreversible action includes initiating a machine learning algorithm 154. The machine learning algorithm can be trained prior to being initiated for mitigation of the irreversible action. The training can be accomplished using a training dataset, where the training dataset includes example notifications, and known mitigation actions to take based on the example responses. The machine learning algorithm can analyze notifications from at least one cybersecurity threat protection application. In embodiments, the detecting can be based on analysis of at least one additional cybersecurity threat protection application notification. The trained machine learning algorithm can be used to examine new notifications from cybersecurity threat protection algorism. The machine learning algorithm can continue to learn based on the new cybersecurity threat protection application notifications and the success or failure of an actionable response triggered to mitigate an irreversible action. In embodiments, the machine learning algorithm can enable a near real-time response to a cybersecurity threat notification. The machine learning algorithm can quickly analyze one or more notifications from one or more cybersecurity threat protection algorithms. The machine learning algorithm can be used to determine the veracity of a threat notification, the reliability of a threat protection application, the severity of the threat, the IT infrastructure elements that are under threat, etc. In further embodiments, the machine learning algorithm self-triggers an actionable response. If a legitimate threat is identified by the machine learning algorithm, then the machine learning algorithm can determine an appropriate action to take to mitigate the threat and can self-trigger that action.

The flow 100 further includes triggering an actionable response 160, based on an analysis of the irreversible action. The actionable response can include one or more of raising an alarm, issuing alerts, and contacting law enforcement; isolating at-risk elements of an IT infrastructure; blocking access to IT infrastructure elements; and so on. In embodiments, the actionable response can include notifying a cybersecurity professional. The cybersecurity professional can include an in-house employee, a contracted individual, etc. In embodiments, the notifying a cybersecurity professional can include a recommendation. The recommendation can include a threat response policy or procedure, one or more tools to use to eradicate a threat, sources of information to determine the extent of a threat, and so on. In embodiments, the recommendation can include ignoring the cybersecurity threat protection application notification. The notification may be a false positive, may be a low-level notification that can be inconsequential, etc. In other embodiments, the actionable response can include an autonomic network reconfiguration. An autonomic network can include a network that can be self-managing. The self-managing network can disconnect itself from the Internet when under attack, can isolate infected or compromised IT infrastructure, etc. In further embodiments, the actionable response can include an autonomic cybersecurity threat protection application reconfiguration. The threat protection application reconfiguration can be based on AI techniques such as machine learning techniques. The application reconfiguration can include adapting the application to evolving cybersecurity threats.

Various embodiments of the flow 100 can be included in a computer program product embodied in a non-transitory computer readable medium that includes code executable by one or more processors.

Figure 2:
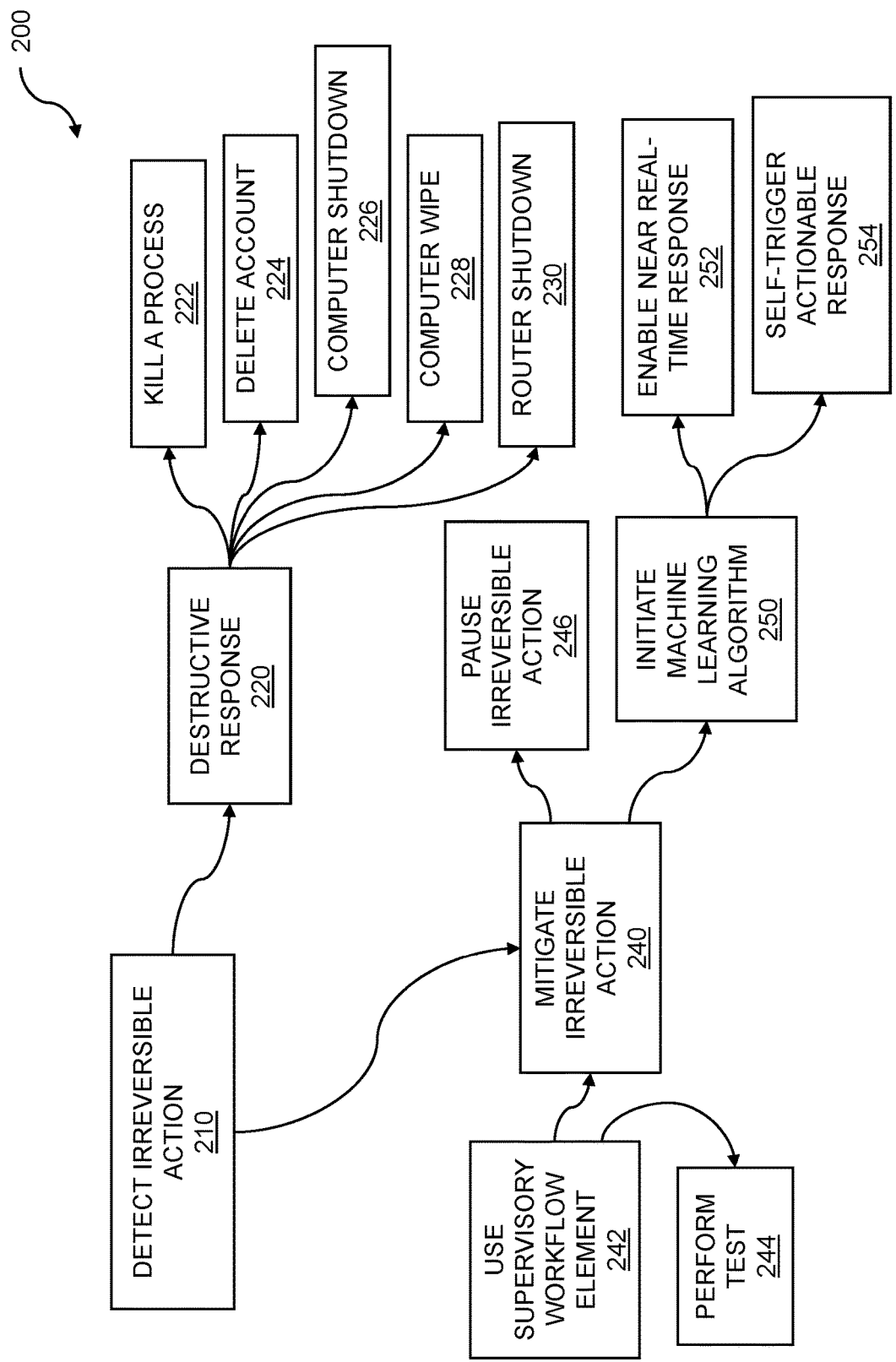
FIG. 2 is a flow diagram for irreversible action detection and mitigation.

FIG. 2 is a flow diagram for irreversible action detection and mitigation. An irreversible action can include an action which destroys or commandeers data, locks out legitimate users authorized to access data and information technology (IT) infrastructure, disables IT infrastructure such as networking infrastructure, and so on. The detection can include autodetection that enables cybersecurity workflow management. A wide range of cybersecurity threats against IT infrastructure is launched as frequently as every few seconds. Each threat requires an effective response to counteract the threat. Discussed above and throughout, a workflow can be analyzed for an irreversible action embedded within the workflow. By detecting the irreversible action prior to its execution, the irreversible action can be mitigated using a supervisory workflow element. The workflow and the supervisory workflow element can be managed by a security orchestration, automation, and response (SOAR) system. Cybersecurity threat protection applications can be used to detect anomalous IT infrastructure operation and threats. The applications can provide a notification, where the notification can report normal operation, anomalous operation, suspicious operation, etc. More than one threat protection application can be used to provide one or more notifications associated with a threat, to report different aspects of a threat, and so on. An actionable response can be triggered based on an analysis of the irreversible action.

The flow 200 includes detecting the irreversible action 210 before it is implemented by the workflow. The detecting can be accomplished by analyzing a notification from a cybersecurity threat protection application, comparing notifications from a plurality of threat protection applications, comparing notifications to ones known to contain irreversible actions, and so on. The irreversible action can damage or disable one or more IT infrastructure elements. In the flow 200, the irreversible action can include a destructive response 220. A destructive response can include a response from which one or more elements of an IT infrastructure cannot recover without repair, replacement, reinstallation, and the like. In the flow 200, the destructive response can include killing a process 222. The process can include any system level process, a user-initiated process, and so on. The process can be associated with an operating system controlling a computer or processor. The process can include an application process such as a process associated with security. In the flow 200, the destructive response can include deleting an account 224. The account that can be deleted can include a user account, an administrator account, and so on. In embodiments, the deleting an account can include creating an additional account such as an additional administrator account. In the flow 200, the destructive response can include shutting down a computer 226. The computer that can be shut down can include a general-purpose computer used for routine tasks such as serving webpages, running payroll or billing, and so on. The computer that can be shut down can include a special-purpose computer such as security server, an authentication server, etc. In the flow 200, the destructive response can include wiping a computer 228. The wiping the computer can include reformatting storage media, securely reformatting storage media (e.g., multiple data over-writes), scrambling data, encrypting data, etc. In the flow 200, the destructive response can include shutting down a router 230. The shutting down the router can include reconfiguring or disabling the router, forcing a hard shutdown (e.g., powering off), and so on. The shutting down the router can block network access within an enterprise, block access by the enterprise to the Internet, etc.

The flow 200 includes mitigating the irreversible action 240 in the workflow. The mitigating the irreversible action can include removing the irreversible action from the workflow, halting the workflow, and so on. In the flow 200, the mitigating the irreversible action can be accomplished using a supervisory workflow element 242. The supervisory workflow element can include one or more computers, processors, processor cores, and the like. The supervisory workflow element can handle fetching and decoding actions from a workflow, executing actions, etc. The supervisory workflow element can ignore, omit, delete, or otherwise prevent execution of the irreversible action. In the flow 200, the supervisory workflow element can be structured to perform a test 244 on the cybersecurity threat protection application notification. The test can be used to verify a notification, to determine the validity of a notification, etc. In embodiments, the test can include an if/then analysis, a table lookup analysis, an if/then/else analysis, or a machine learning algorithm-based analysis. In the flow 200, the mitigating can include pausing the irreversible action 246 until a subsequent cybersecurity threat protection application notification is received. The subsequent cybersecurity threat protection application notification can be received from the same threat protection application or from an additional threat protection application.

In the flow 200, the mitigating the irreversible action includes initiating a machine learning algorithm 250. The machine learning algorithm can be trained to analyze notifications from at least one cybersecurity threat protection application. The training can be accomplished using a training dataset, where the training dataset includes example notifications, and known mitigation actions to take based on the example responses. The trained machine learning algorithm can be used to examine new notifications from cybersecurity threat protection algorithms. Further, the machine learning algorithm can continue to learn based on the new notifications and the success or failure of an actionable response triggered to mitigate an irreversible action. In the flow 200, the machine learning algorithm enables near real-time response 252. The machine learning algorithm can quickly analyze one or more notifications from one or more cybersecurity threat protection algorithms. The machine learning algorithm can be used to determine the validity of a threat notification. The machine learning algorithm can further determine the reliability of a threat protection application, the severity of the threat, etc. In the flow 200, the machine learning algorithm self-triggers the actionable response 254. If a legitimate threat is identified by the machine learning algorithm, then the machine learning algorithm can determine an appropriate action to take to mitigate the threat and can self-trigger that action.

Various embodiments of the flow 200 can be included in a computer program product embodied in a non-transitory computer readable medium that includes code executable by one or more processors.

Figure 3:
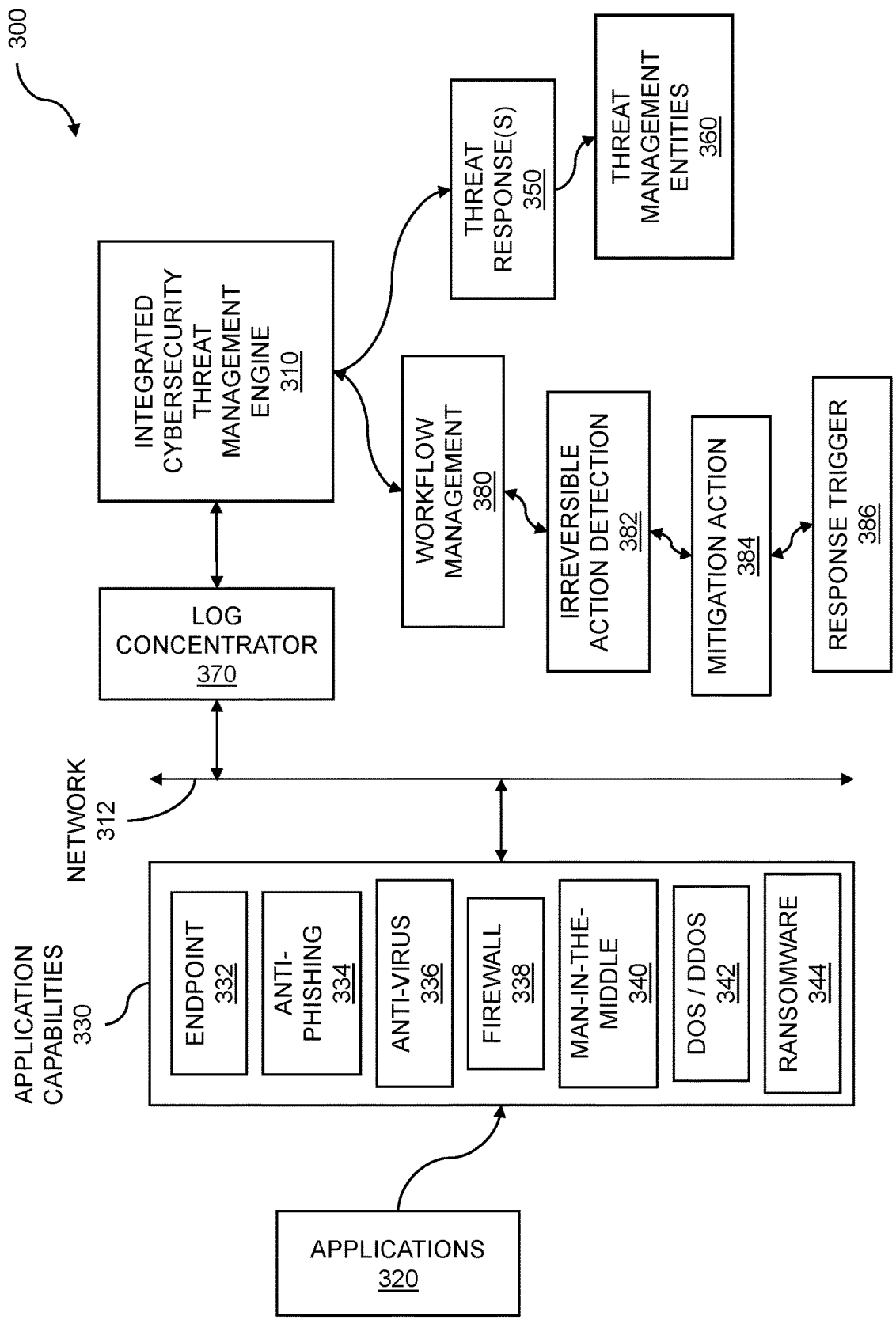
FIG. 3 is a system block diagram for cybersecurity workflow management using autodetection.

FIG. 3 is a system block diagram for cybersecurity workflow management using autodetection. The cybersecurity workflow can be managed using a supervisory workflow element. The supervisory workflow element enables cybersecurity threat management. Threat management such as cybersecurity threat management includes detecting an irreversible action before the action is implemented by a workflow and mitigating the irreversible action. One or more responses to those threats are triggered. The threats can originate from within an organization, from beyond an organization, or from sources within and beyond the organization. The threats can range from relatively minor ones that can be easily detected and eradicated, to major threats that can completely disable the operation of the organization. The threats can be detected using one or more applications that can monitor a variety of IT-based activities. Cybersecurity management can be accomplished based on cybersecurity workflow management using autodetection. A cybersecurity threat protection workflow is accessed. At least one cybersecurity threat protection application notification is received, wherein the cybersecurity threat protection application notification causes an irreversible action to be scheduled by the workflow. The irreversible action is detected before it is implemented by the workflow. The irreversible action in the workflow is mitigated using a supervisory workflow element.

An example system block diagram for threat management 300 is shown. Threat management such as cybersecurity threat management is critical to an organization. The cybersecurity threat management is used to monitor operations such as data operations within the organization. When anomalies or outright threats are detected, threat management applies a variety of techniques to determine the cause of an anomaly, a source of a threat, and responses to the anomalies and threats. The system block diagram can include an integrated cybersecurity threat management engine 310. The management engine can access applications; collect and ingest log files from the applications; sort, integrate, and evaluate threat protection elements; and so on. The engine can include one or more processors; processor cores within integrated circuits or chips, CPUs, GPUs; and so on. The management engine can be coupled to a network 312 such as a computer network. The network can be based on wired and wireless communications techniques.

The system block diagram can include a plurality of applications 320. The applications can include network-connected cybersecurity threat protection applications. The applications can perform tasks such as network and processor monitoring; data integrity monitoring; data, services, and physical access control; etc. Some applications within the plurality of threat protection applications can perform unique tasks, can perform similar or redundant tasks, and the like. The applications within the plurality of cybersecurity threat protection applications can include application capabilities 330. The application capabilities can include endpoint protection 332. Endpoint protection can include authentication and supervision of "endpoint" devices. The endpoint devices can include desktop computers, laptop computers, tablet computers, personal electronic devices such as smartphones and PDAs, and so on. Endpoint protection can include enabling access of the endpoint devices based on one or more rights. Access rights can include creating, editing, and deleting files, folders, and so on. Access rights can include read-write, read-only, write-only (e.g., a drop box), etc. Endpoint protection can restrict access, impose security rules, and the like.

Application capabilities can include anti-phishing 334 techniques. "Phishing" threats can be based on sending fraudulent email messages, where the messages appear to be from a legitimate sender who may be known to the recipient. The messages are used to gather sensitive, identifying information about an individual which is then used to defraud the individual. The application capabilities can include anti-virus 336 techniques. Anti-virus techniques can be used to detect viruses that can be embedded in data such as images, audio files, and so on. The application capabilities can include firewall 338 techniques. Firewall techniques can be used to block network traffic, applications, etc. that can attempt to penetrate a network and IT infrastructure using one or more network ports and communications protocols. The application capabilities can include man-in-the-middle detection and prevention techniques 340. A "man-in-the-middle" cybersecurity threat includes interception of communications between a user or endpoint device and an entity with which the user or endpoint device is trying to communicate. The communications interception attempts to extract personal or identifying information from the communications for fraudulent purposes. The application capabilities can include denial of service (DOS) and distributed denial of service (DDOS) 342 detection techniques. Denial of service attacks attempt to render a website, computer, processor, and so on unreachable or unusable by overwhelming it with requests. The application capabilities can include ransomware 344 detection techniques. Ransomware attacks encrypt a victim's data. The encrypted data is only decrypted, if at all, after payment of a ransom.

The system block diagram 300 includes one or more threat responses 350. The one or more threat responses are generated by the integrated cybersecurity threat management engine 310. The generated responses can be provided to a cybersecurity threat management entity 360. A cybersecurity threat management entity can include a human-based entity, a machine-based entity, or a combination of human-based and machine-based entities. In embodiments, the cybersecurity threat management entity can be a cybersecurity professional. The cybersecurity professional can be an employee of an organization, a consultant to the organization, and so on. In other embodiments, the cybersecurity threat management entity can be a security orchestration, automation, and response (SOAR) application. The SOAR application can handle threat detection, response generation, case tracking, and so on. The system block diagram can include a log concentrator 370. The log concentrator can sort a plurality of log files, can integrate the log files, and so on. The concentrator can extract key information from the log files. The concentrator can compress log file data.

The system block diagram 300 includes a supervisory workflow element for workflow management 380. The supervisory workflow element can access a cybersecurity threat protection workflow, receive and analyze at least one cybersecurity threat protection application notification, detect an irreversible action, mitigate the irreversible action, and so on. In embodiments, the workflow and the supervisory workflow element are managed by a security orchestration, automation, and response (SOAR) system. Discussed previously, the SOAR application microservice can handle threat detection, response generation, case tracking, and so on. In embodiments, the synchronization element can implement a multidirectional synchronization server. The system block diagram 300 can include an irreversible action detector 382. The irreversible action detector can detect the irreversible action before it is implemented by the workflow. In embodiments, the detecting the irreversible action can include parsing verbs in the cybersecurity threat protection application notification. The verbs associated with irreversible actions can include move, delete, rename, format, erase, encrypt, and so on. In other embodiments, the detecting the irreversible action includes parsing verbs in the cybersecurity threat protection application notification. In further embodiments, the detecting the irreversible action can be based on metadata from the cybersecurity threat protection application. The metadata, or "data about data", can include network metadata, where the network metadata can include information associated with all communications that can take place on the network.

The system block diagram 300 can include a mitigation action element 384. The mitigation action element can mitigate the irreversible action in the workflow, using the supervisory workflow element. In embodiments, the mitigating the irreversible action can include initiating a machine learning algorithm. The machine learning algorithm can be trained using prior irreversible action data and mitigation techniques that successfully countered the prior irreversible actions. In embodiments, the machine learning algorithm can enable near real-time response. The system block diagram includes a response trigger 386. The response trigger can trigger an actionable response, based on analysis of the irreversible action. In embodiments, the machine learning algorithm can self-trigger the actionable response. The actionable response can enable scalability of a connected security orchestration, automation, and response (SOAR) system (discussed below). In embodiments, the actionable response can include notifying a cybersecurity professional. The recommendation can include one or more courses of action, software tools that can be applied to the threat, and so on. In embodiments, the recommendation can include ignoring the cybersecurity threat protection application notification. The recommendation can include comparing the notification from a threat protection application to a notification from an additional threat protection application. The actionable response that was triggered can include performing one or more autonomic or self-management actions. In embodiments, the actionable response can include an autonomic network reconfiguration. The autonomic network reconfiguration can be used to isolate an enterprise network from the "outside world". The reconfiguration can be used to isolate infected systems, correct IT infrastructure, etc. The reconfiguration can swap in or swap out networking equipment such as switches and routers. In other embodiments, the actionable response can include an autonomic cybersecurity threat protection application reconfiguration. The autonomic cybersecurity threat protection application reconfiguration can include rebooting or reinstalling the application, scaling the application, isolating hacked or misbehaving applications, and the like.

Figure 4:
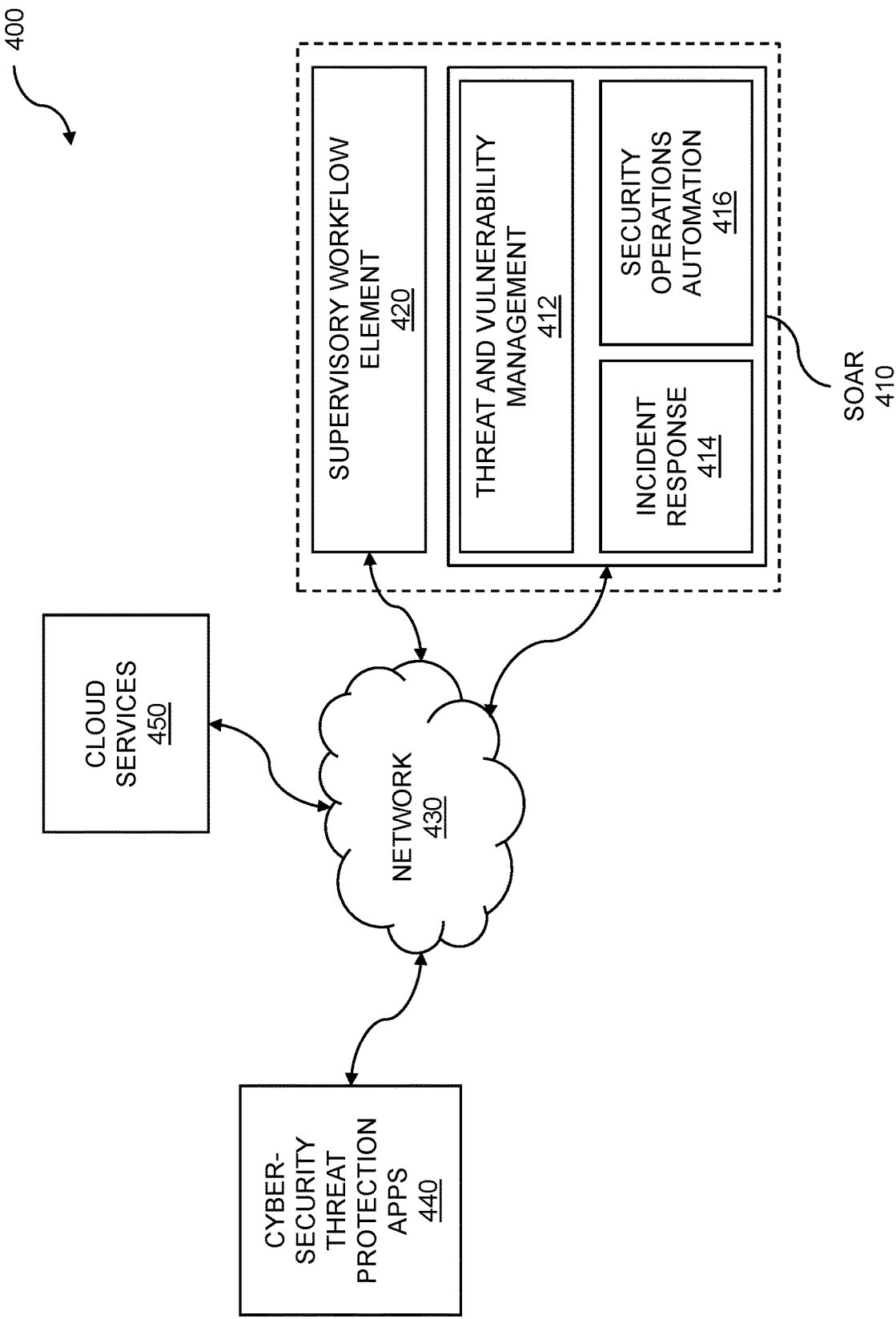
FIG. 4 illustrates a cloud-connected security orchestration, automation, and response (SOAR).

FIG. 4 illustrates a cloud-connected security orchestration, automation, and response (SOAR) system. Discussed above and throughout, cybersecurity threats arise as often as every few seconds. These threats target individual users, businesses, universities, hospitals, government agencies, and so on. The cybersecurity threats constitute extreme menaces, and indeed existential crises, to the enterprises. Cybersecurity threat management includes identifying that a threat is underway, what IT infrastructure and data are under attack, the type of threat, etc. The cybersecurity threat management ideally then proceeds to block or remove the threat, isolate affected infrastructure, perform eradication or remediation, and the like. Cybersecurity threat management is enabled by cybersecurity workflow management using autodetection. The autodetection seeks to determine that the perceived threat is "real" rather than that a threat protection application is malfunctioning due to an error, a corruption, or a hacking attack. A cybersecurity threat protection workflow is accessed. At least one cybersecurity threat protection application notification is received, wherein the cybersecurity threat protection application notification causes an irreversible action to be scheduled by the workflow. The irreversible action is detected before it is implemented by the workflow. The irreversible action in the workflow is mitigated using a supervisory workflow element.

A cloud-connected security orchestration, automation, and response (SOAR) system is illustrated 400. The SOAR can comprise a cybersecurity component such as 410, where the SOAR can be based on one or more cybersecurity threat protection applications, tools, techniques, and so on. The SOAR can enable data collection from a wide range of data sources such as threat data sources. The threat data sources can include data uploaded by cybersecurity experts, data produced by cybersecurity threat protection applications, and so on. The SOAR can be used to manage threat protection processes, anti-threat technologies, and human expertise. The SOAR can centralize management of IT assets such as networks, processors, data storage elements, etc. The SOAR can provide threat alerts and can provide contexts for the alerts. The SOAR can further automate responses to threats, adapt the responses using machine learning, and so on.

The SOAR 410 can include one or more components associated with cybersecurity threat management. The SOAR can include a threat and vulnerability management component 412. The threat and vulnerability management component can configure and control IT infrastructure elements such as routers, switches, processors, storage area networks (SANs), and so on. The SOAR can include an incident response component 414. The incident response component can provide alerts, can trigger one or more actionable responses, and the like. In embodiments, the actionable response can enable scalability of a connected SOAR system. The SOAR can be scaled up to address a large number of threats, to reduce threat response time, etc. In embodiments, the actionable response can include a recommendation for a cybersecurity professional. The recommendation can include a recommendation for threat response policy, a source for further information about the threat, etc. In further embodiments, the actionable response can include an autonomic network reconfiguration. An autonomic network reconfiguration can include isolating IT elements, restricting IT elements, and the like. In embodiments, the actionable response can include an autonomic cybersecurity threat protection application reconfiguration. The threat protection application reconfiguration can include isolating, reinstalling, reconfiguring, or rebooting an application. The threat protection application reconfiguration can include synchronizing operation of two or more threat protection applications.

The SOAR can include security operations automation 416. Security operations management can include automatically securing IT infrastructure elements such as switches, routers, processors, storage elements, etc., where the securing can be based on a procedure, a policy, and so on. The security operations automation can include updating IT element software and firmware, installing and configuring security software such as antivirus software, and the like. The SOAR can be associated with a supervisory workflow element 420. The supervisory workflow element can provide access to a threat protection workflow, processing of notifications received from one or more cybersecurity threat protection applications, detection of actions within a workflow such as an irreversible action, and so on. In embodiments, the supervisory workflow element can be structured to perform a test on a cybersecurity threat protection application notification. The test can be used to verify a cause for the notification, to compare the notification with one or more other notifications from the same threat protection application or from other threat protection applications, etc. In embodiments, the test can include an if/then analysis, a table lookup analysis, an if/then/else analysis, or a machine learning algorithm-based analysis. In a usage example, two antivirus applications can be synchronized. One antivirus application can provide an alert for a detected cybersecurity threat while the second application can provide no indication of a threat. Because of differing detection results, the applications can be analyzed for proper operation, checked for malware, and so on. The supervisory workflow element can perform these checks and any required remediations without burdening the SOAR.

The SOAR can use a network 430 to access a plurality of cybersecurity threat protection applications 440. The network can include a wired network, a wireless network, a hybrid wireless/wireless network, and so on. The network can be based on wired networking standards such as Ethernet™ (IEEE 802.3), wireless networking standards such as Wi-Fi™ (IEEE 802.11), and so on. The cybersecurity threat protection applications can provide capabilities such as endpoint protection, anti-phishing, antivirus, firewalls, and so on. The cybersecurity threat protection applications can further detect and protect against man-in-the middle ruses, denial of service (DOS) and distributed denial of service (DDOS) attacks, ransomware, and the like. In embodiments, the background synchronization service can communicate to the plurality of network-connected cybersecurity threat protection applications using cloud services 450. The cloud services can provide access and can provide IT services such as software as a service (SaaS), platform as a service (PaaS), infrastructure as a service (IaaS), and so on.

Figure 5:
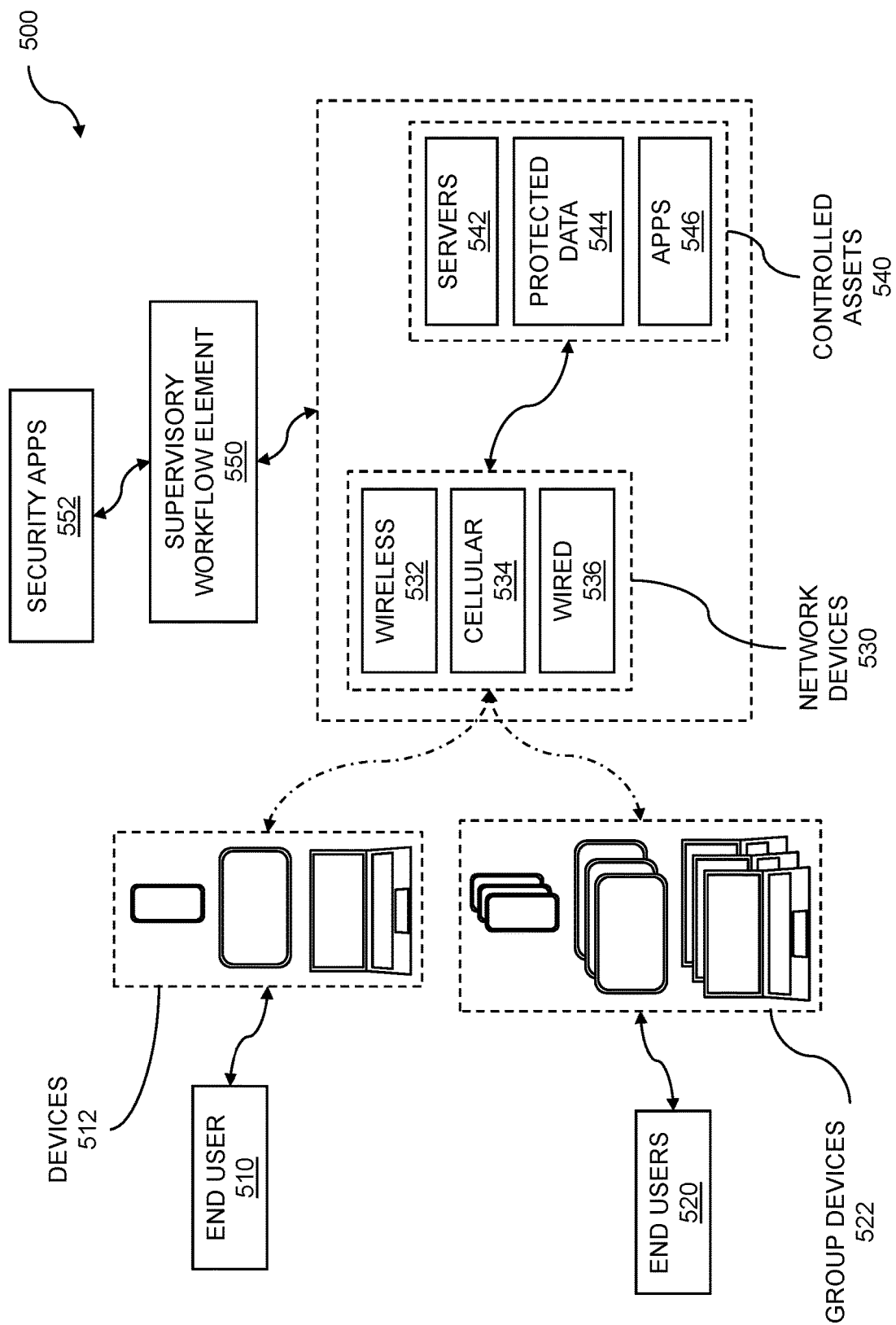
FIG. 5 is a system block diagram for devices and groups.

FIG. 5 is a system block diagram for devices and groups. Cybersecurity threats pose extreme risks to data networks associated with individual users, business enterprises, universities, hospitals, government agencies, and so on. Management of a cybersecurity threat can include identifying that a threat exists, determining the type of threat, blocking or removing the threat, and so on. Threat management techniques can be applied to individual devices, groups of devices, networks, IT assets, and so on. Cybersecurity management of devices and groups uses autodetection. A plurality of network-connected cybersecurity threat protection applications is accessed. A cybersecurity threat protection workflow is accessed. At least one cybersecurity threat protection application notification is received, wherein the cybersecurity threat protection application notification causes an irreversible action to be scheduled by the workflow. The irreversible action is detected before it is implemented by the workflow. The irreversible action in the workflow is mitigated using a supervisory workflow element.

A system block diagram for an individual user, groups of users, and devices 500 is shown. A user 510 can access one or more devices 512. The user can include an employee, a contractor, a faculty member, a student, a physician, a nurse, a manager, a salesperson, and so on. The user can have access to the one or more devices for purposes such as interacting with an enterprise, university, hospital, retail establishment, and the like. The devices can include personal electronic devices, electronic devices issued by an employer, etc. The devices can include a handheld device such as a smartphone, tablet, PDA, and the like. The devices can include a laptop, a lightweight device such as a Chromebook™ or similar device, and so on. A group of users 520 can access a plurality of devices 522. The users can also include employees, university or hospital affiliates, etc. The users can access a plurality of devices for purposes such as interacting with an enterprise, etc. The devices can include personal electronic devices, electronic devices issued by an employer, etc. The devices can include handheld devices, a laptop, a lightweight device, etc.

In the system block diagram 500, communication to and from individual devices, groups of devices, and so on, is accomplished using one or more network devices 530. The network devices can support data transfer, network resource access, and the like. Various types of network devices can be used. In embodiments, the network devices can support wireless 532 networking. The wireless network can be based on standard computer communication protocols such as 802.11 Wi-Fi, Bluetooth, etc. In other embodiments, the network devices can support cellular 534 communication. The cellular communication can be based on standard protocols such as CDMA and GSM standards. The cellular communication can include 4G, 5G, and so on. In other embodiments, the network devices can support wired 536 communication. The wired network communication can be based on standards such as Ethernet™.

The individual users and groups of users can use their devices to communicate with controlled assets 540. Access to controlled assets can require authentication such as a username and password, two-factor authentication, a cryptographic key, and so on. In the system block diagram 500, the controlled assets can include servers 542. The servers can include processors, CPUs, GPUs, processor cores, and so on. The servers can include parallel processors. The servers can include customized servers for specialized applications. The controlled assets can include protected data 544. The protected data can include secured data, confidential data, classified data, and the like. Access to the protected data can be based on authentication, a job type, an employee rank, etc. The controlled assets can include applications 546. The applications can include specialized applications for data analysis; proprietary code for design, analysis, and processing; etc. Access to the applications can also include authentication, access controlled by an access control list (ACL), and the like.

The system block diagram 500 can include a supervisory workflow element 550. Discussed above and throughout, one or more workflows can be managed by a supervisory workflow element. The supervisory workflow element can handle a variety of cybersecurity workflow management tasks such as access to a threat protection workflow, processing of notifications received from one or more cybersecurity threat protection applications, detection of actions within a workflow such as an irreversible action, and so on. The supervisory workflow element can provide workflow supervision between a plurality of cybersecurity threat protection applications 552 and a cybersecurity manager. The supervisory workflow element can receive a notification from at least one of the plurality of cybersecurity threat protection applications. The notification, which can include high-volume incoming status data, can be processed, analyzed, etc. In embodiments, the workflow and the supervisory workflow element can be managed by a security orchestration, automation, and response (SOAR) system. The SOAR system can be used to handle tasks such as cybersecurity threat and vulnerability management, incident tracking and response, security operations management, and so on. The SOAR system can identify a real-time state change in IT infrastructure status based on one or more notifications from one or more cybersecurity threat protection applications. The notification that is received by the supervisory workflow element can be processed. The processing the notification can enable filtering of incoming status data. The filtering can include identifying and removing duplicate data, removing spurious or erroneous data, etc. The processing can further inform an actionable response to a real-time state change in the status as indicated by the notification. The informing can include a recommendation for a cybersecurity professional. The recommendation for the cybersecurity professional can include recommending a course of action to further characterize a cybersecurity threat, recommending tools for stopping and eradicating the threat, and the like. In embodiments, the recommendation can include information on classification of the state change.

Figure 6:
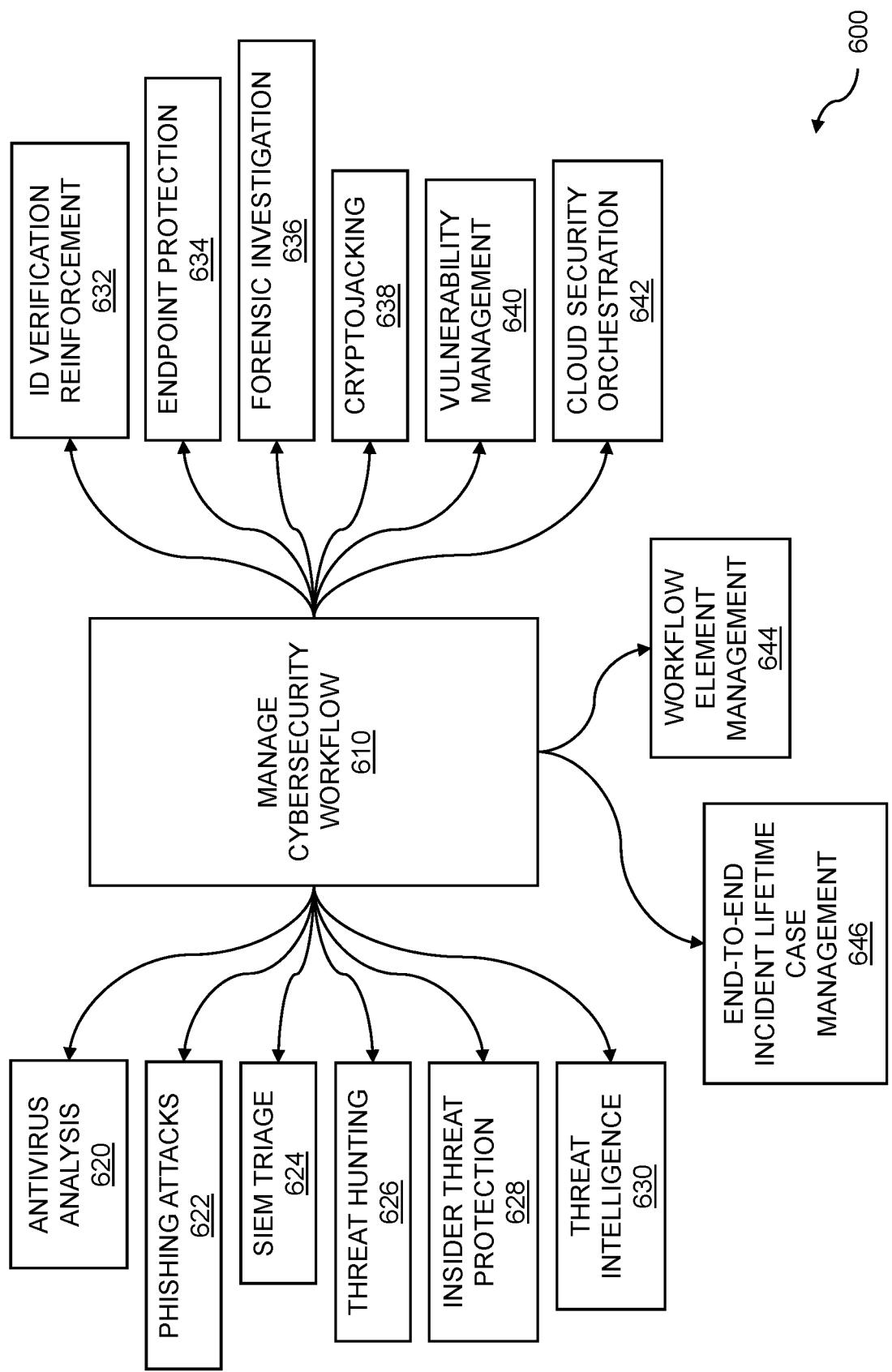
FIG. 6 is a flow diagram for cybersecurity workflow management.

FIG. 6 is a flow diagram for cybersecurity workflow management. Information technology (IT) infrastructure comprises computing devices, storage devices, networks, perhaps personal devices, and so on. Whether these IT elements are operated by an individual for personal use or by an organization in support of operations, all of the IT elements are targets of malicious attacks from outside an organization. Worse yet, some of the attacks can even originate from within an organization. Cybersecurity workflow management includes accessing a cybersecurity threat protection workflow. The workflow can include steps, techniques, procedures, codes, applications, and so on for detecting cybersecurity threats and for mitigating those detected threats. The workflow contains scheduled actions, where some of the actions can be irreversible. Irreversible actions can include deleting files, reconfiguring a network, and the like. Notifications associated with detected cybersecurity threats can be received from a variety of threat protection applications. The applications can detect an attack, determine the type of attack, determine the origin of an attack, and so on. Further, cybersecurity workflow management provides techniques for addressing issues resulting from the attacks by countering the attacks and rectifying issues caused by the attacks. The various threat protection applications provide elements for detecting, neutralizing, countering, and rectifying cybersecurity threats. The elements associated with the applications can address substantially similar cybersecurity needs. Cybersecurity workflow management is accomplished using supervisory workflow element. A cybersecurity threat protection workflow is accessed. At least one cybersecurity threat protection application notification is received, wherein the cybersecurity threat protection application notification causes an irreversible action to be scheduled by the workflow. The irreversible action is detected before it is implemented by the workflow. The irreversible action is mitigated in the workflow, using a supervisory workflow element.

The diagram 600 includes cybersecurity management 610. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The diagram 600 includes antivirus analysis 620. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The diagram 600 can include analysis of phishing attacks 622. Phishing is a form of attack that attempts to fraudulently obtain personal, sensitive, or private data and information. The data or information that is sought by a phishing attack can include personal information such as name, address, date of birth, telephone number, email address, and so on. The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The diagram 600 includes security information and event management (STEM) triage 624. SIEM, which combines the management of security information and security events, can provide analysis of security alerts, alarms, warnings, etc. in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The diagram 600 includes threat hunting 626. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The diagram 600 includes insider threat protection 628. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The diagram 600 includes threat intelligence 630. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The diagram 600 includes identity verification reinforcement 632. Identity verification can include techniques to verify that a person who has access to computing systems, data systems, networks, and so on that are associated with an enterprise, is in fact a real person. Identity verification can be based on physical documents such as a government issued identification documents. The diagram 600 can include endpoint protection 634. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device, including personal electronic devices, meets certain standards prior to connection to the enterprise network. The standards can include approved devices, operating systems, applications, antivirus applications, virtual private network apps, etc.

The diagram 600 includes forensic investigation 636. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The diagram 600 includes the detection of cryptojacking 638. Cryptojacking can include hijacking of computers, servers, personal electronic devices, and so on for the purposes of mining cryptocurrency. The diagram 600 includes vulnerability management 640. Vulnerability management seeks to reduce risks to computing systems, data systems, networks, and so on by identifying, evaluating, correcting, and communicating vulnerabilities associated with the computing systems and the applications that are executed on the computing systems. The diagram 600 includes cloud security orchestration 642. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement.

The diagram 600 includes workflow element management 644. One or more workflows can be managed by a supervisory workflow element. The supervisory workflow element can handle access to a threat protection workflow, processing of notifications received from one or more cybersecurity threat protection applications, detection of actions within a workflow such as an irreversible action, and so on. In embodiments, the workflow and the supervisory workflow element can be managed by a security orchestration, automation, and response (SOAR) system. The SOAR system can be used to handle tasks such as cybersecurity threat and vulnerability management, incident tracking and response, security operations management, and so on. In embodiments, the supervisory workflow element can be structured to perform a test on the cybersecurity threat protection application notification. The test can be used to verify validity of the notification, to compare the notification to one or more other notifications, etc. In embodiments, the test can include an if/then analysis, a table lookup analysis, an if/then/else analysis, or a machine learning algorithm-based analysis. The diagram 600 includes end-to-end incident lifetime case management 646. An incident can include a virus outbreak, a distributed denial of service (DDOS) attack, and the like. Incident lifetime management can include identifying that an incident has occurred, notifying that the incident has occurred and escalating response to the incident, investigating and diagnosing the incident, resolving the incident, and recovering from the incident. Incident lifetime management can further include closing the incident.

Figure 7:
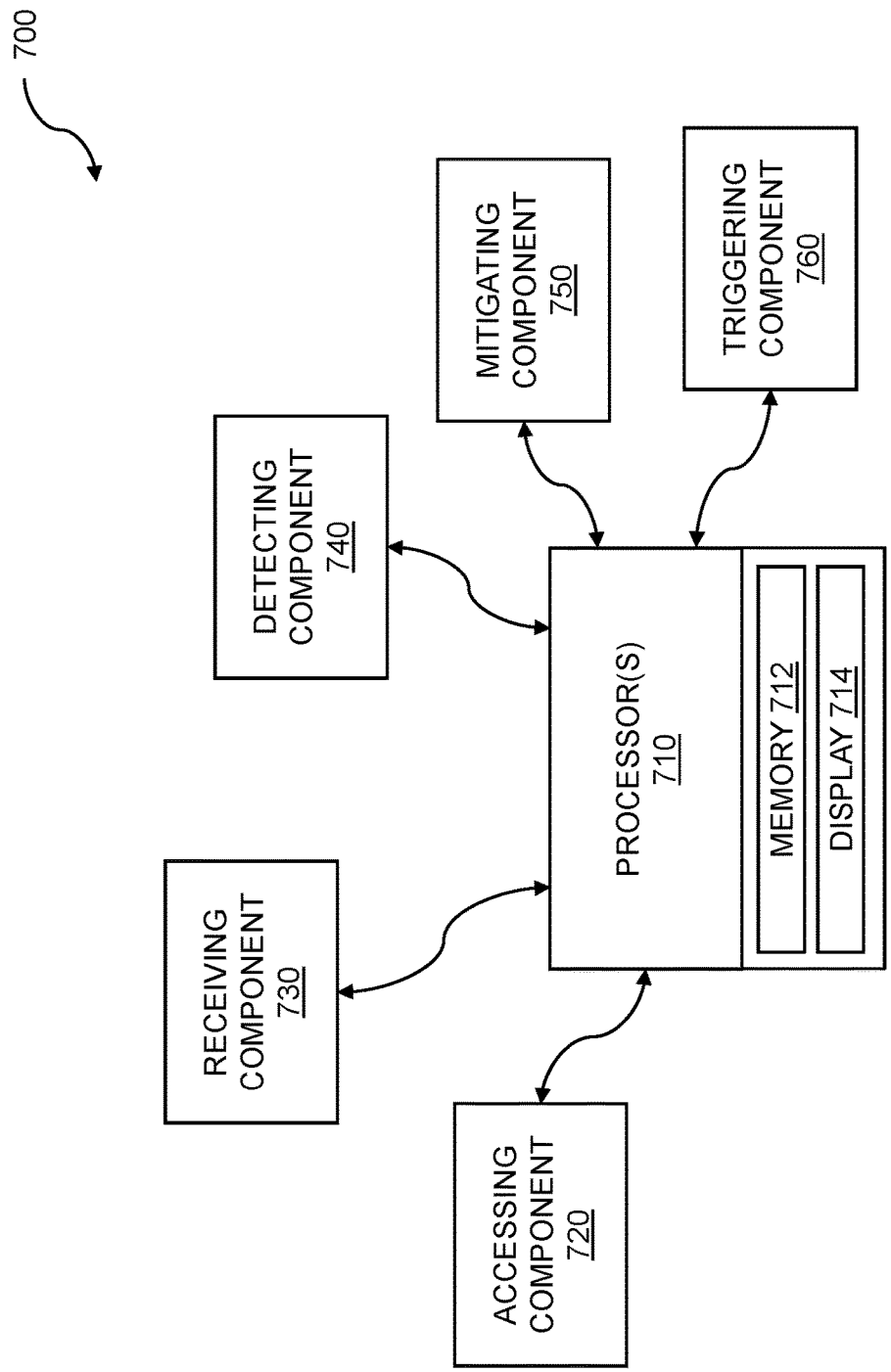
FIG. 7 is a system diagram for cybersecurity workflow management using autodetection.

FIG. 7 is a system diagram for cybersecurity workflow management using autodetection. Businesses, hospitals, government agencies, schools, and other organizations seek to secure their computing operations and infrastructure against cybersecurity threats. The detection of and response to all cybersecurity threats are mission critical to each of these organizations, irrespective of their size. The computational operations performed by the organizations are based on data operations including manipulations, storage, security, transfers, and so on. The computing infrastructure used to perform the computational operations includes servers, desktop computers, laptop computers, personal electronic devices, etc. Some cybersecurity threats have been designed to exploit hardware and software vulnerabilities. Other cybersecurity threats are based on social engineering techniques such as honeytraps, clickbait, phishing attacks, ransomware, distributed denial of service (DDoS) attacks, third-party software hacks, targeting cloud computing and storage vulnerabilities, and the like. Cybersecurity workflow management using autodetection can be used trigger an actionable response based on an identified real-time state change in status from at least one cybersecurity threat protection application. The real-time state change in status can be used to detect a cybersecurity threat; to determine the extent and severity of the cybersecurity threat; and to remove, neutralize, or counter the threat in as little time and with as minimal disruption as possible. A cybersecurity threat protection workflow is accessed. At least one cybersecurity threat protection application notification is received, wherein the cybersecurity threat protection application notification causes an irreversible action to be scheduled by the workflow. The irreversible action is detected before it is implemented by the workflow. The irreversible action in the workflow is mitigated using a supervisory workflow element. An actionable response is triggered based on an analysis of the irreversible action.

The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, one or more cybersecurity applications, log files, information associated with one or more data networks, a supervisory workflow, data associated with a status, one or more actionable responses, and the like. Information associated with cybersecurity threat management can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display.

The system 700 can include an accessing component 720. The accessing component 720 can be used for accessing a cybersecurity threat protection workflow. The threat protection workflow can include one or more cybersecurity threat protection tasks and commands. The workflow can be used to enable automation of one or more tasks associated with cybersecurity management. Access to the workflow can be enabled through a graphical user interface (GUI). The GUI can provide graphical control of a workflow, such as selecting and controlling one or more cybersecurity threat protection applications. The GUI can enable dragging and dropping of tasks, commands, and so on into a workflow. Cybersecurity threat protection applications can be swapped dynamically into or out of a workflow. The swapping-in and the swapping-out are enabled by a universal data layer (UDL). The UDL can handle differences in commands, interfacing, signaling, etc., associated with the one or more cybersecurity threat protection tasks. The UDL can enable applications to be swapped without having to edit a workflow or create a new workflow to address the swapped-in application.

A cybersecurity threat protection workflow can enable access to a plurality of network-connected cybersecurity threat protection applications. The applications can include applications for threat detection, assessment, and response management; web security; antivirus; dark web monitoring; security ("white hat") testing; and other cybersecurity threat protection application capabilities. In embodiments, the cybersecurity threat protection application capabilities can include endpoint protection, anti-phishing protection, anti-virus protection, firewall protection, man-in-the-middle protection, denial of service protection, distributed denial of service protection, and ransomware protection. The plurality of cybersecurity threat protection applications can include at least two different data management schemas. A data management schema can include an organization or collection of management techniques associated with data. The management techniques can include data storage, access control to data (e.g., access control list or ACL, role-based access), and so on.

The system 700 can include a receiving component 730. The receiving component 730 can receive at least one cybersecurity threat protection application notification, wherein the cybersecurity threat protection application notification causes an irreversible action to be scheduled by the workflow. The receiving notifications can include receiving status reports and updates from at least one of the plurality of cybersecurity threat protection applications. Notification from a cybersecurity threat protection application can include an indication of normal operation or other status of one or more processors, networks, and other information technology (IT) infrastructure. The received notifications can include an abnormal status such as high-volume incoming status data. The status data from the one or more cybersecurity threat protection applications can include an indication of a potential, detected, or ongoing cybersecurity event or situation. In embodiments, the irreversible action can include a destructive response. The destructive response can be initiated by an unauthorized actor such as a hacker. In embodiments, the destructive response can include killing a process, deleting an account, shutting down a computer, wiping a computer, or shutting down a router. The destructive response can include a hostile action such as unauthorized encryption of data.

The notification can include data associated with an alert, a warning, etc. The notification data can include device-related information. The device-related information can include a type of device such as a handheld device, a portable device, a personal device, a device provided by an organization, etc. The notification data can include an event name, an application name, an event count, a category such as a low-level category, a source IP address and port, a destination IP address and port, a username, a magnitude, etc. The notification data can include threat protection elements. The threat protection elements can include non-cybersecurity, network-related elements. These elements can provide additional information that can help pinpoint a source of a cybersecurity threat, a threat target, a priority level, etc. The non-cybersecurity, network-related elements can include information technology (IT) tool output, network configuration data, cybersecurity threat protection application metadata, network-related metadata, network client physical location data, network client internet protocol (IP) identification data, and user-entered data. The notification data can further include information about the user of a device, a data service, and so on. The user information can include identifying information associated with the user; a user's role, status, and rank within an organization; user privileges such as access and security privileges; user location; and the like.

The system 700 can include a detecting component 740. The detecting component 740 can detect the irreversible action before it is implemented by the workflow. The detecting can be based on analyzing a cybersecurity threat protection application notification. In embodiments, the detecting the irreversible action can include parsing verbs in the cybersecurity threat protection application notification. The verbs can include actions such as move, rename, edit, delete, erase, remove, modify, encrypt, and so on. The verbs that are parsed can include commands within the workflow. In embodiments, the verbs can be contained in cybersecurity threat protection application outbound commands. The outbound commands can include commands such as system commands for computers, processors, servers, and so on. The outbound commands can include configuration commands for networking infrastructure such as routers and switches. In embodiments, the detecting the irreversible action can be based on metadata from the cybersecurity threat protection application. The metadata, or "data about the data", can include a number of notifications, the frequency of notifications, changes in notifications, etc. In embodiments, the machine learning algorithm can enable near real-time response. The response can be based on techniques that were successfully applied previously. The response can adapt based on changes, trends, and so on associated with the cybersecurity threats. In embodiments, the machine learning algorithm can self-trigger the actionable response. An actionable response can include halting workflow operation, removing a command from the workflow, substituting commands in the workflow, etc.

The system 700 can include a mitigating component 750. The mitigating component 750 can mitigate the irreversible action in the workflow, using a supervisory workflow element. The supervisory workflow element can include a software element such as a program or application. The supervisory workflow element can include a hardware element such as a computer, processor, processor core, etc., that can supervise and control execution of a workflow. In embodiments, the mitigating the irreversible action can include initiating a machine learning algorithm. The machine learning algorithm can be trained to identify irreversible actions and what counteractions can be taken against the irreversible action. In embodiments, the workflow and the supervisory workflow element can be managed by a security orchestration, automation, and response (SOAR) system. The SOAR system can be used to handle threat and vulnerability management, incident response, security operations automation, etc. In embodiments, the supervisory workflow element can be structured to perform a test on the cybersecurity threat protection application notification. A test that is performed can be selected and executed by the machine learning algorithm. In embodiments, the test can include an if/then analysis, a table lookup analysis, an if/then/else analysis, or a machine learning algorithm-based analysis. Based on an outcome of a test, one or more actionable responses can be triggered. In other embodiments, the mitigating can include pausing the irreversible action until a subsequent cybersecurity threat protection application notification is received. The notification can be used to verify the validity of the first notification, to refute the first notification, etc. In embodiments, the subsequent cybersecurity threat protection application notification can be received from a different cybersecurity threat protection application. The notifications can be used to "vote" on the validity of a threat notification. In further embodiments, the subsequent cybersecurity threat protection application notification can be received from the same cybersecurity threat protection application. The notifications can be analyzed for consistency.

In embodiments, the system 700 can include a triggering component 760. The triggering component 760 can trigger an actionable response, based on an analysis of the irreversible action. The actionable response can include issuing one or more commands, alarms, alerts, notifications, and so on. In embodiments, the actionable response can include notifying a cybersecurity professional. The cybersecurity professional can include a member of an information technology cybersecurity staff, a law enforcement agent, a government official, and so on. In embodiments, the notification for the cybersecurity professional can include a recommendation. The recommendation can include a task, a set of steps, a technique, a protocol, etc. In other embodiments, the recommendation can include ignoring the cybersecurity threat protection application notification. In a usage example, the machine learning algorithm can determine that the cybersecurity threat protection application notification is a false alarm, a false positive, irrelevant, and the like. In embodiments, the actionable response can include an autonomic network reconfiguration. The automatic network reconfiguration can include isolating IT infrastructure which may have been compromised, locking out external connections to a network, etc. In other embodiments the actionable response can include an autonomic cybersecurity threat protection application reconfiguration. The application reconfiguration can include a reset, a threat information update, and so on. In a usage example, an application reconfiguration can include a live update of virus protection information.

The triggering an actionable response for cybersecurity threat management can include generating a notification. The notification can be used to trigger a variety of responses. The responding to a cybersecurity threat notification can include managing individual devices coupled to a data network, groups of devices, regions of a data network, and so on. The responding can include granting user access to an asset, denying access, isolating one or more devices, notifying security or law enforcement, and the like. The responding can include one or more tasks, procedures, protocols, workflows, techniques, etc., associated with cybersecurity. In embodiments, the responding to a cybersecurity threat can include managing one or more of antivirus analysis, phishing attack response, review, security information and event management (STEM) triage, threat hunting, insider threat protection, threat intelligence, identity verification reinforcement, endpoint protection, forensic investigation, cryptojacking, vulnerability, cloud security orchestration, and end-to-end incident lifecycle cases. The responding can include "white hat" testing such as penetration testing of one or more of networks, systems, devices, and so on. The white hat penetration testing can include white box testing, where a tester can have full access and knowledge of networks, systems, and so on. The white hat testing can further include black box testing (no access or knowledge), gray box testing (some access and knowledge), etc.

The triggering an actionable response can include simulating or emulating cybersecurity threats. Embodiments further include simulating cybersecurity threat scenarios by activating inputs of the first mapping independently of the plurality of cybersecurity threat protection applications. The simulation can be based on virtual activation, actual activation, and so on. In embodiments, the simulating virtually activates cybersecurity measures in a simulation mode. One or more devices coupled to a data network can be taken offline, placed in a "security playpen", etc. In other embodiments, the simulating actually activates cybersecurity measures in the data network. The actually activating cybersecurity measures in the data network can be accomplished using a variety of techniques such as activating outputs of the second mapping. Further embodiments include activating one or more data enrichment protocols for a threat, based on the data stimuli received from at least one of the plurality of cybersecurity threat protection applications. The data enrichment can be accomplished by enabling additional features of a cybersecurity threat application, activating additional applications, etc. In embodiments, the one or more data enrichment protocols can include accessing a website. The website can include a secure website. In embodiments, the accessing a website can enable additional information gathering for the threat.

Further embodiments can include generating a set of rules to enable the accessing, the receiving, the detecting, and the mitigating. Various techniques can be applied to generating a set of rules. In embodiments, the set of rules can be determined using human input. The human input can be obtained for a cybersecurity profession, a panel of cybersecurity experts, and the like. In other embodiments, the set of rules can be determined using machine learning. The machine learning can be used to try a wide variety of response scenarios, to evaluate success or failure of a given scenario, to choose a "best" scenario, etc. In other embodiments, the set of rules can be determined using a combination of human input and machine learning.

Disclosed embodiments include a computer program product embodied in a non-transitory computer readable medium for cybersecurity management, the computer program product comprising code which causes one or more processors to perform operations of: accessing a cybersecurity threat protection workflow; receiving at least one cybersecurity threat protection application notification, wherein the cybersecurity threat protection application notification causes an irreversible action to be scheduled by the workflow; detecting the irreversible action before it is implemented by the workflow; and mitigating the irreversible action in the workflow, using a supervisory workflow element. Disclosed embodiments further include a computer system for cybersecurity comprising: a memory which stores instructions; one or more processors coupled to the memory wherein the one or more processors, when executing the instructions which are stored, are configured to: access a cybersecurity threat protection workflow; receive at least one cybersecurity threat protection application notification, wherein the cybersecurity threat protection application notification causes an irreversible action to be scheduled by the workflow; detect the irreversible action before it is implemented by the workflow; and mitigate the irreversible action in the workflow, using a supervisory workflow element.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:
   accessing a cybersecurity threat protection workflow;
   receiving at least one cybersecurity threat protection application notification, wherein the cybersecurity threat protection application notification causes an irreversible action to be scheduled by the workflow;
   detecting the irreversible action before it is implemented by the workflow, wherein the detecting the irreversible action includes parsing verbs in the cybersecurity threat protection application notification; and
   mitigating the irreversible action in the workflow, using a supervisory workflow element.

2. The method of claim 1 wherein the detecting is based on analysis of at least one additional cybersecurity threat protection application notification.

3. The method of claim 1 wherein the irreversible action comprises a destructive response.

4. The method of claim 3 wherein the destructive response includes killing a process, deleting an account, shutting down a computer, wiping a computer, or shutting down a router.

5. The method of claim 1 wherein the mitigating the irreversible action comprises initiating a machine learning algorithm.

6. The method of claim 5 wherein the machine learning algorithm enables near real-time response or an actionable response.

7. The method of claim 1 wherein the workflow and the supervisory workflow element are managed by a security orchestration, automation, and response (SOAR) system.

8. The method of claim 1 wherein the supervisory workflow element is structured to perform a test on the cybersecurity threat protection application notification.

9. The method of claim 8 wherein the test comprises an if/then analysis, a table lookup analysis, an if/then/else analysis, or a machine learning algorithm-based analysis.

10. The method of claim 1 further comprising triggering an actionable response, based on an analysis of the irreversible action.

11. The method of claim 10 wherein the actionable response comprises notifying a cybersecurity professional.

12. The method of claim 11 wherein the notifying a cybersecurity professional includes a recommendation.

13. The method of claim 12 wherein the recommendation includes ignoring the cybersecurity threat protection application notification.

14. The method of claim 10 wherein the actionable response comprises an autonomic network reconfiguration.

15. The method of claim 10 wherein the actionable response comprises an autonomic cybersecurity threat protection application reconfiguration.

16. The method of claim 1 wherein the verbs are contained in cybersecurity threat protection application outbound commands.

17. The method of claim 1 wherein the detecting the irreversible action is based on metadata from a cybersecurity threat protection application.

18. The method of claim 1 wherein the mitigating includes pausing the irreversible action until a subsequent cybersecurity threat protection application notification is received.

19. The method of claim 18 wherein the subsequent cybersecurity threat protection application notification is received from a different cybersecurity threat protection application.

20. The method of claim 18 wherein the subsequent cybersecurity threat protection application notification is received from the same cybersecurity threat protection application.

21. A computer program product embodied in a non-transitory computer readable medium for cybersecurity management, the computer program product comprising code which causes one or more processors to perform operations of:
   accessing a cybersecurity threat protection workflow;
   receiving at least one cybersecurity threat protection application notification, wherein the cybersecurity threat protection application notification causes an irreversible action to be scheduled by the workflow;
   detecting the irreversible action before it is implemented by the workflow, wherein the detecting the irreversible action includes parsing verbs in the cybersecurity threat protection application notification; and
   mitigating the irreversible action in the workflow, using a supervisory workflow element.

22. The computer program product of claim 21, further comprising triggering an actionable response, based on an analysis of the irreversible action, wherein the actionable response comprises at least one of (i) notifying a cybersecurity professional and (ii) a recommendation for responding.

23. A computer system for cybersecurity comprising:
   a memory which stores instructions;
      one or more processors coupled to the memory, wherein the one or more processors, when executing the instructions which are stored, are configured to:
      access a cybersecurity threat protection workflow;
      receive at least one cybersecurity threat protection application notification, wherein the cybersecurity threat protection application notification causes an irreversible action to be scheduled by the workflow;
      detect the irreversible action before it is implemented by the workflow, wherein the detecting the irreversible action includes parsing verbs in the cybersecurity threat protection application notification; and
   mitigate the irreversible action in the workflow, using a supervisory workflow element.

24. The computer system of claim 23, wherein the one or more processors are further configured to trigger an actionable response, based on an analysis of the irreversible action, wherein the actionable response comprises at least one of (i) notifying a cybersecurity professional and (ii) a recommendation for responding.

* * * * *